United States Patent [19]

England et al.

[11] Patent Number: 5,884,102
[45] Date of Patent: Mar. 16, 1999

[54] METHOD AND APPARATUS FOR A CONFIGURABLE MEANS OF CONNECTION BETWEEN AN EMBEDDED PROCESSOR AND A PERSONAL COMPUTER

[75] Inventors: David George England; Krishna Shetty, both of Chandler, Ariz.

[73] Assignee: Intel Corporation, Santa Clara, Calif.

[21] Appl. No.: 865,801

[22] Filed: May 30, 1997

[51] Int. Cl.[6] .................................................. G06F 13/00
[52] U.S. Cl. ...................... 395/882; 395/822; 395/828; 395/834; 395/838; 395/858; 395/872; 395/892; 395/309
[58] Field of Search ............................ 395/309–312, 395/822–825, 828–838, 856–860, 872–894

[56] References Cited

U.S. PATENT DOCUMENTS

| | | | |
|---|---|---|---|
| 5,408,614 | 4/1995 | Thornton et al. | 395/841 |
| 5,537,558 | 7/1996 | Fletcher et al. | 395/309 |
| 5,550,861 | 8/1996 | Chan et al. | 375/222 |
| 5,619,722 | 4/1997 | Lovrenich | 395/822 |
| 5,671,374 | 9/1997 | Postman et al. | 395/309 |
| 5,765,027 | 6/1998 | Want et al. | 395/860 |
| 5,784,633 | 7/1998 | Petty | 395/880 |
| 5,793,989 | 8/1998 | Moss et al. | 395/882 |
| 5,805,416 | 9/1998 | Friend et al. | 361/686 |

*Primary Examiner*—Christopher B. Shin
*Attorney, Agent, or Firm*—Blakely, Sokoloff, Taylor & Zafman LLP

[57] ABSTRACT

The invention provides an enhanced peripheral device that can connect to a computer in either in one of two modes: A PCMCIA mode and a serial mode. This allows the device to continue communicating with computer even if unplugged from the PCMCIA connector. Detection circuitry is used to determine whether the peripheral device is connected using the PCMCIA connector or the serial connector. Switching circuitry then routes data from connected connector to the various data handing units, such as UARTs present in the peripheral and the computer.

14 Claims, 6 Drawing Sheets

METHOD AND APPARATUS FOR A CONFIGURABLE MEANS OF CONNECTION BETWEEN AN EMBEDDED PROCESSOR AND A PERSONAL COMPUTER

BACKGROUND OF THE INVENTION

1. Field of the Invention

The invention relates generally to communications systems. More specifically, the invention relates to peripheral computer connection.

2. Description of the Related Art

Computer peripheral devices, such as modems, can be connected to computers in a wide variety of connection types. Two such connection types in vogue currently are the serial interface type and the PCMCIA (Personal Computer Memory Card International Association) (also known as the PC Card standard) type. The serial interface type can use a port, such that the peripheral can be connected externally to the computer, while PCMCIA uses a PCMCIA slot, requiring connection on that PCMCIA slot.

FIG. 1A shows a prior art external serial modem 110 connected via serial cable 120 to a personal computer (PC) 100. Both external serial modem 110 and PC 100 have serial adapters/ports 114 and 104, respectively. These serial adapters/ports allow a serial cable to be connected to facilitate the transfer of data. The serial adapters/ports 104 and 114 are shown with a plurality of pin-out and pin-in connections which send and receive serial interface signals. Also shown in expanded form are universal asynchronous receive/transmit (UART) components 106 each coupled respectively to PC 100 and external serial modem 110. FIG. 1B is a detailed illustration of a UART and associated signals.

As shown in FIG. 1B, each UART consists of a block of control registers and a pair of shift registers. When the UARTs 106 and 116 receive data from parallel data bus 105 and 115, respectively, to be transmitted (using TX data signal) over serial adapters/ports 104 and 114, the parallel data is stored serially bit by bit in a shift register TXFIFO (transmit first in-first out). The TXFIFO is a serial register capable of holding N bits. Each consecutive bit is shifted such that the first bit is output from the register first, the second bit output second, and so forth. The serialized data is sent over the TX data pin and out through serial adapters/ports 104 and 114. Data is received through the RX data pin from serial adapters/ports 104, 114 and is shifted into a shift register RXFIFO (receive first in-first out). The RXFIFO shift register is connected to the parallel data bus 115 and 105 such that once the shift register is full, all N bits that are held by the shift register are output over the parallel data bus simultaneously.

Referring back to FIG. 1A, in this manner, the UARTs 106 and 116 are capable of converting serial data received from serial adapters/ports 104 and 114, respectively, into parallel form to be transmitted over parallel data bus 105 and 115, respectively. UARTs 106 are also capable of serializing data received from parallel data bus 105 and 115 for transmission through serial adapters/ports 104, 114 over serial cable 120. The CPU 102 of PC 100 is thus able to communicate with modem processor 112 of external serial modem 110. The essential operation is communication of an "embedded" processor (modem processor 112) with a system processor (CPU 102).

The scenario of FIG. 1A represents standard PC serial communication with an external device such as a serial modem. The parallelism in internal structure of PC 100 and external serial modem 110 allows for a UART to be used in each to serialize parallel data in the same manner. However, the serial interface as currently implemented in the art does not allow a PCMCIA device which typically connects to a PCMCIA slot via a power connector/cable to connect via a serial interface.

FIG. 2 shows a PCMCIA (PC Card) external modem 210 coupled to a PC 200. External modem 210, a PC Card device, also makes use of UART but in a different manner from external serial modem 110. External modem 210 is, essentially, a pair of UARTs 216 and 217. UART 216 is coupled over parallel data bus 215 to a modem processor 212. UART 217 represents the UART of the serial interface on the PC-end, as shown in FIG. 1A, transplanted to the PCMCIA modem. In practical design, the two UARTs are not physically separate entities though so pictured in FIG. 2. PC 200 has card detect circuitry which utilizes pull-up resistors 203 and 201 coupled to each of card detect pins 230 and a NOR gate 204. If modem 210 is connected via PCMCIA connector 220, card detect pins 230 will be active low and after inversion at NOR gate 204 cause the PCMCIA I/F (interface) 206 to recognize that an external device has been plugged in. CPU 202 communicates with modem processor 212 by sending/receiving data on parallel data bus 205 and then through PCMCIA I/F 206.

Currently, PCMCIA or PC Card devices are designed to only operate whilst plugged into the PC. When the devices are removed, their connection to the PC is lost. There is a need in some instances to be able to connect to the PC even though the device is not plugged into the PCMCIA slot, such as in a pager modem. It is desirable for a pager modem, whether connected via the PCMCIA or not, to be able to transfer messages to the PC. However, the current design for pager modems does not allow connection to the computer via serial port. Thus, the modem processor in a PCMCIA device such as pager modem, under current practice, utilizes a PCMCIA slot by necessity. Thus, there is needed a mechanism which allows a PCMCIA device to interface via a serial interface to allow the PCMCIA I/F to be otherwise utilized.

SUMMARY OF THE INVENTION

A system for dynamically modifying the mode of communication for a first device connecting to a second device is disclosed. There is provided detection circuitry which detects whether a first connector or a second connector is used to connect the first and second devices. Connection via the first connector indicates a first mode of operation while connection to a second connector indicates a second mode operation. The second device has switching circuitry which is configured to route data from the first connector during the first mode and to route data from the second connector during the second mode.

BRIEF DESCRIPTION OF THE DRAWINGS

The objects, features and advantages of the method and apparatus for the present invention will be apparent from the following description in which.

DETAILED DESCRIPTION OF THE INVENTION

Figure 1A:
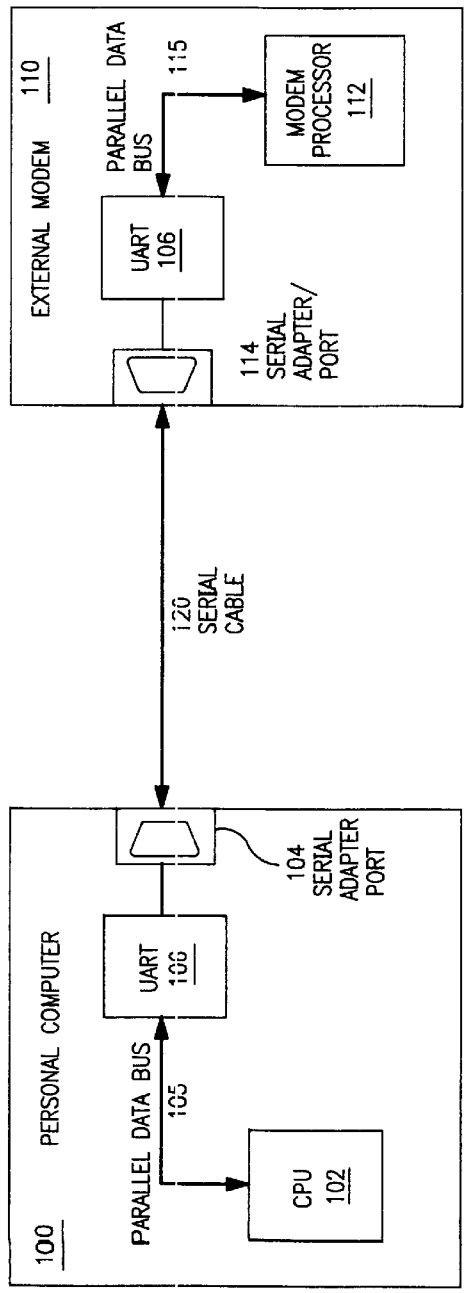
FIG. 1A shows a prior art external modem connected via serial cable to a personal computer.
Figure 1B:
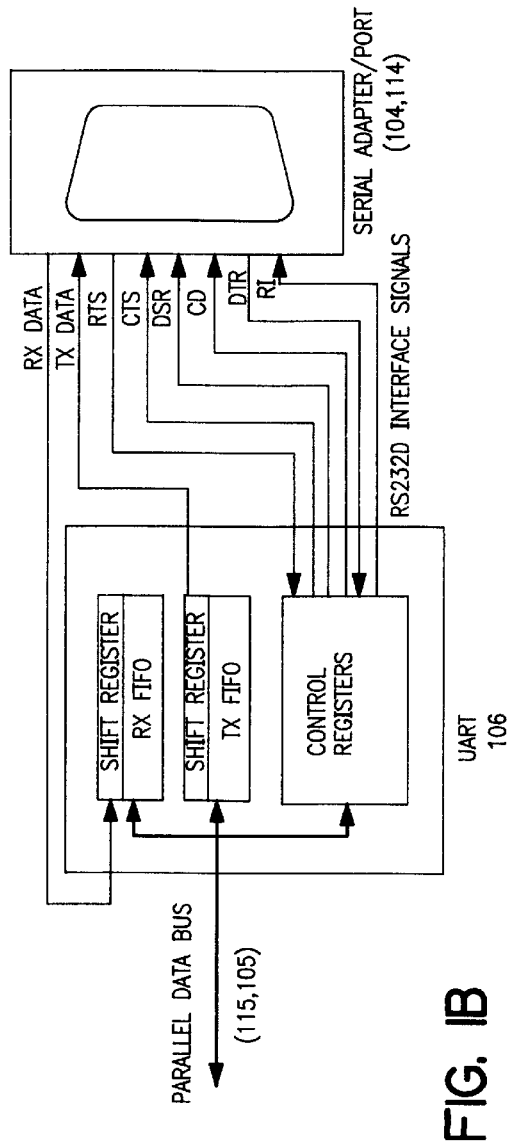
FIG. 1B is a detailed illustration of a UART and associated signals.
Figure 2:
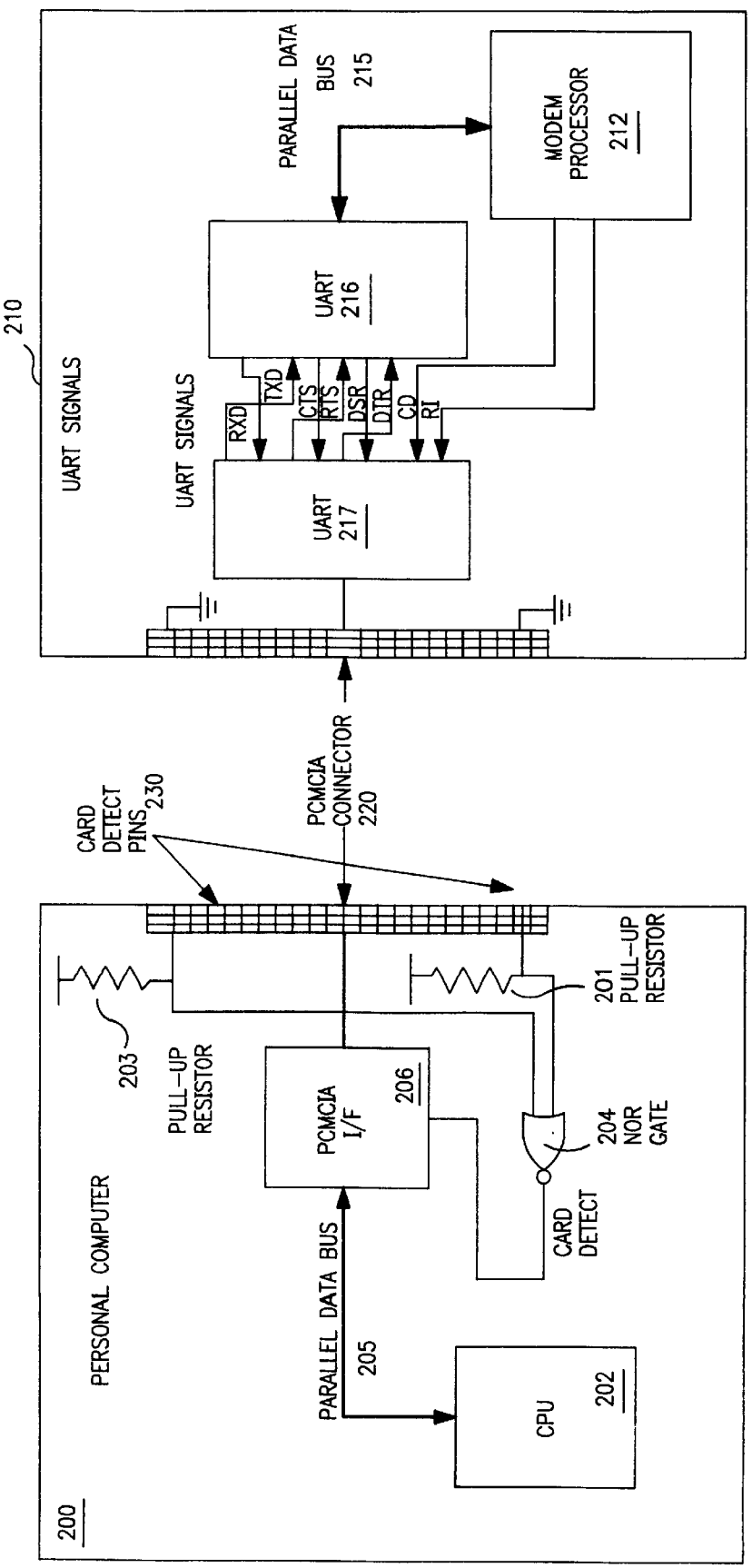
FIG. 2 shows a prior art PCMCIA (PC Card) external modem coupled to a personal computer.

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

In describing this invention, the words "port", "adapter", and "interface" are used interchangeably to describe wired components on devices that provide the device with an end for connecting a cable. Further, though the exemplary embodiments refer to modems that may be enhanced according to the invention, other peripheral devices such as PDAs (personal digital assistants), disks, etc. may also be enhanced in a similar fashion by one skilled in the art.

FIG. 3A shows a first embodiment of the invention. FIG. 3A shows a PCMCIA external modem 310 capable of connecting to a PC 300 either via PCMCIA connector 320 or a serial connector 340, as provided for by one embodiment of the invention. PC 300 has both PCMCIA I/F unit 306 for PCMCIA functionality and a serial port/adapter 308 for serial (also well-known in the art as RS232) functionality. In this embodiment, the external modem 310 is modified from prior art PCMCIA devices in that a serial adapter/port 311 and a data switch 318 are provided. Modem 310, according to one embodiment of the invention, operates in either of a first mode, where external modem 310 behaves as a PCMCIA device, or a second mode, where external modem 310 behaves as a serial device.

Figure 3:
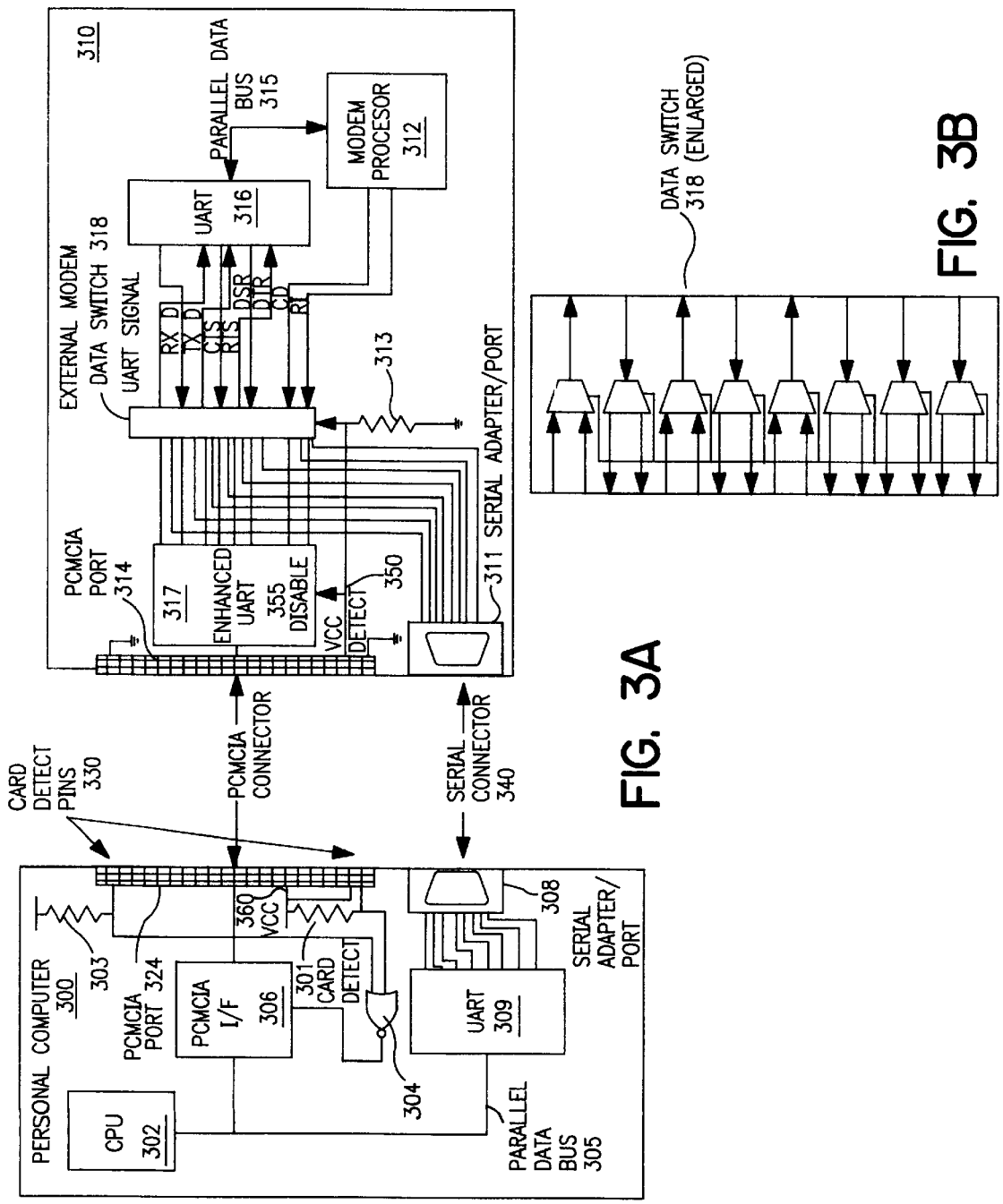
FIG. 3A shows a first embodiment of the invention.
FIG. 3B is a detailed illustration of a data switch.

In the first mode, the VCC detect signal 350 of external modem 310 is active since the external modem 310 will be coupled via a PCMCIA connector 320. The power-in of VCC 360 from the PC 300 will drive VCC detect 350 active through PCMCIA connector 320 on a detect pin and keep enabled an enhanced UART 317 on external modem 310. Enhanced UART 317 is coupled to PCMCIA port 314 and a data switch 318 and differs from ordinary UARTs in that a disable pin/line 355 is provided to disable the UART. FIG. 3B is a detailed illustration of a data switch. Data switch 318 is composed of a set of 2-to-1 multiplexers, one multiplexer for each UART data or control line/signal. UART signals, shown in FIGS. 1–4, are used to primarily control the flow data through the UART by signaling when data is allowed to flow through the parallel interface of the UART. When the TXFIFO buffer of the UART is full, data flow is signaled to stop until some of the data in TXFIFO is shifted out. Other signals such as CD (Carrier Detect) indicate when a valid modem signal is detected on the telephone line to which the modem is connected. Likewise the signal RI (Ring Indicate) is made active when a incoming telephone ring is detected. These signals and others labeled CTS, RTS, DSR and DTR are well-known in the art and will not be described further, except where they relate to the various embodiments of the invention. When VCC detect signal 350 is active, (external modem 310 in the first mode), it causes the input from enhanced UART 317 to be selected by each multiplexer in data switch 318. Thus, VCC detect signal 350 acts both as an enabling/disabling mechanism for the UART and a select line for the multiplexer of data switch 318. In the first mode, pull-down resistor 313 is utilized to help detect when external modem 310 is removed (unplugged or otherwise disconnected) from PC 300 by forcing the VCC detect signal 350 to ground VCC. In the first mode, external modem 310 behaves similar to a PCMCIA device which can be connected on PCMCIA I/F 306, as described for FIG. 2 above.

Card detect circuitry includes a NOR gate 304 which receives a pair of power (voltage) card detect signals from PCMCIA port 324. The card detect circuitry detects the presence of a PCMCIA device, such as external modem 310 having been plugged into PCMCIA port 324. Card detect signals from PCMCIA port 324 are active low, and thus, when low, will indicate a connection with an external device such as external modem 310. Pull-up resistors 301 and 303 operate similar to pull-up resistors 201 and 203 of FIG. 2.

In the second mode, the serial mode of operation, the enhanced UART 317 is an extraneous element. In the second mode, VCC detect signal 350 is inactive (low) and cause the disable pin/line 355 of enhanced UART 317 to disable enhanced UART 317. Further, VCC detect signal 350, when inactive, causes the multiplexers of data switch 318 to select the data lines from a serial adapter/port 311 to which it is coupled rather than from enhanced UART 317. The multiplexers of data switch 318 can be built using standard LSI (Large Scale Integration) or VLSI (Very Large Scale Integration) logic element s and are well-known in the art of logic design. By using a standard UART 316, the modified PCMCIA external modem 310 can communicate data as an external serial device. The serial mode functionality of external modem 310, according to this embodiment of the invention, enables PCMCIA I/F 306 on PC 300 to be otherwise utilized for another PCMCIA device. This allows the PCMCIA external modem 310 to still operate and communicate data to PC 300 though connected via serial connector.

PC 300 has a CPU 302, coupled to UART 309 and PCMCIA I/F 306 over a parallel data bus 305. These elements operate similar to corresponding elements such as CPU 102 and 202, UART 106 and PCMCIA I/F 206 variously shown in FIGS. 1 and 2. Modem 310 has modem processor 312 coupled to UART 316 over a parallel data bus 315 which operates similar to external serial modem 110 and external modem 210, modem processors 112 and 212 and parallel data bus 105 and 205. Modem processor 312 is coupled directly to data switch 318. Unlike modem processor 212, however, by use of the two modes, processor 312 can communicate with 302 by either a serial connection or a PCMCIA connection. Utilizing plug-and-play features of recent BIOS code or operating systems such as Windows '95™ (a trademark of Microsoft Corp.), while PC 300 is still powered, a PCMCIA modem card configured like external modem 310 can be unplugged from the PCMCIA connector and attached via serial connector 340. Though an IRQ (Interrupt Request) line utilized in PC 300 may need to be established for the serial port, this can be achieved automatically or through user configuration. While the computer is turned on, the decoupling from PCMCIA and coupling to the serial port can be achieved according to this embodiment of the invention. When PC 300 is a laptop, this frees the PCMCIA slot to connect another device such as a hard disk.

Figure 4:
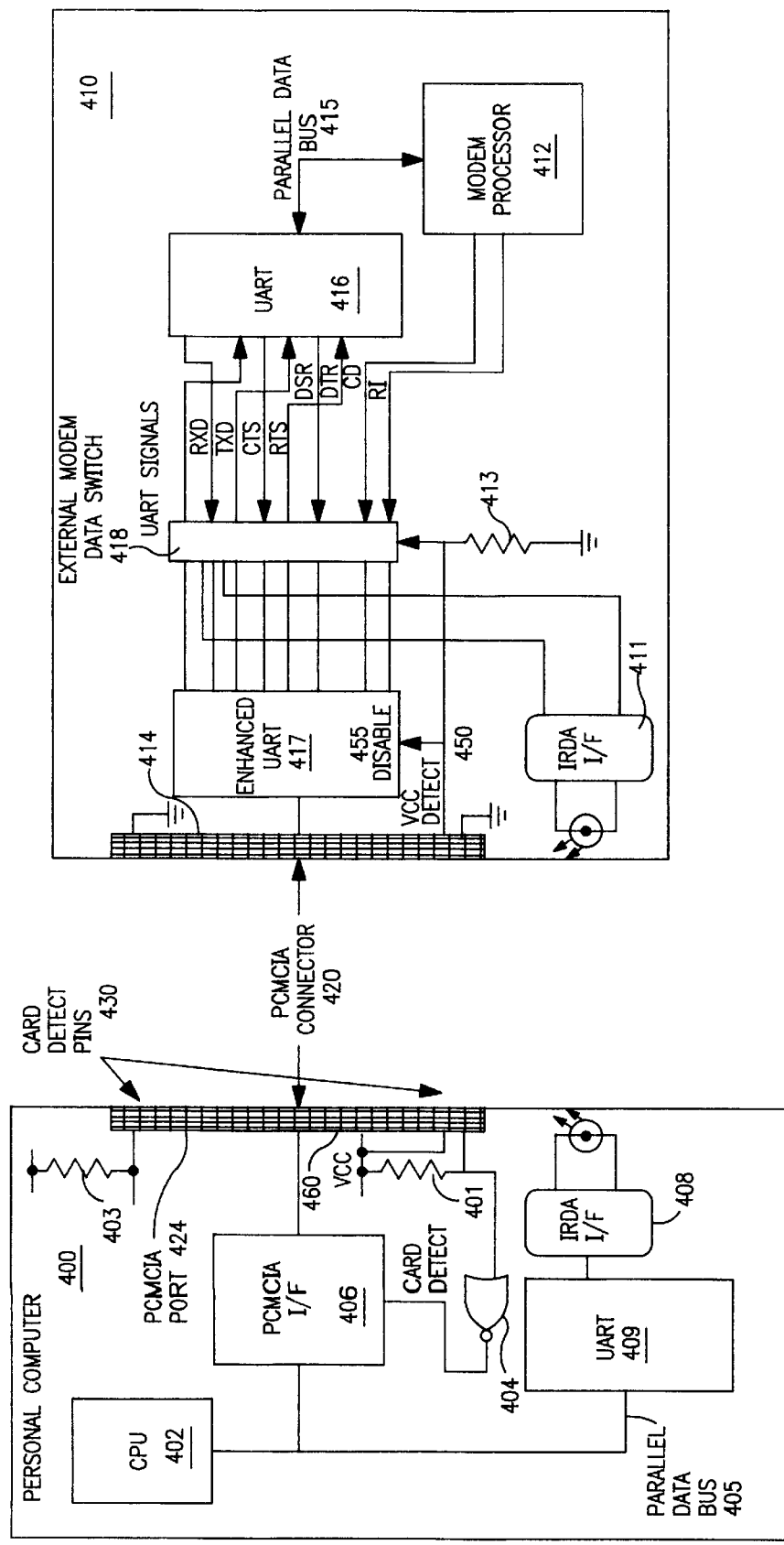
FIG. 4 shows a second embodiment of the invention.

FIG. 4 shows a second embodiment of the invention. Another peripheral device, external modem 410, which has infrared capability, is shown enhanced according to the invention to facilitate dynamic change of connection method. Card detect pins 430, PCMCIA connector 420, PCMCIA port 424, VCC 460, VCC detect 450, pull-up resistors 401 and 403 and NOR gate 404 operate similar to card detect pins 330, PCMCIA connector 320, PCMCIA 324, VCC 360, VCC detect 350, pull-up resistors 301 and 303 and NOR gate 304, respectively. Likewise, on external modem 410, enhanced UART 417, disable pin 455, pull-down resistor 413, PCMCIA port 414, UART 416, parallel data bus 415 and modem processor 412 operate similar to enhanced UART 317, disable pin 355, pull-down resistor 313, PCMCIA port 314, UART 316, parallel data bus 315, and modem processor 312, respectively, in FIG. 3A. In this embodiment, a PCMCIA device can connect through an IRDA I/F (Infra-red Data Access Interface) and remotely link with a PC 400 similarly situated with IRDA capability. PC 400 has a CPU 402 which communicates over a parallel data bus 405 to a UART 409 and a PCMCIA I/F 406. UART 409 is coupled to IRDA I/F 408 and serializes data from parallel data bus 405 for output via IRDA I/F 408. IRDA I/F 408 transmits and receives data using infra-red signals and does not need a physical cable link. IRDA I/F 411 is coupled to data switch 418 directly. The IRDA interface consists of a Light Emitting Diode (LED) and a photo sensor/detector. Serial data is pulse code modulated which is used to turn on and off the LED, thus emitting pulses of light corresponding to the data being sent. The photo detector converts these light pulses back into electrical signals, where they are demodulated back to serial data.

Figure 5:
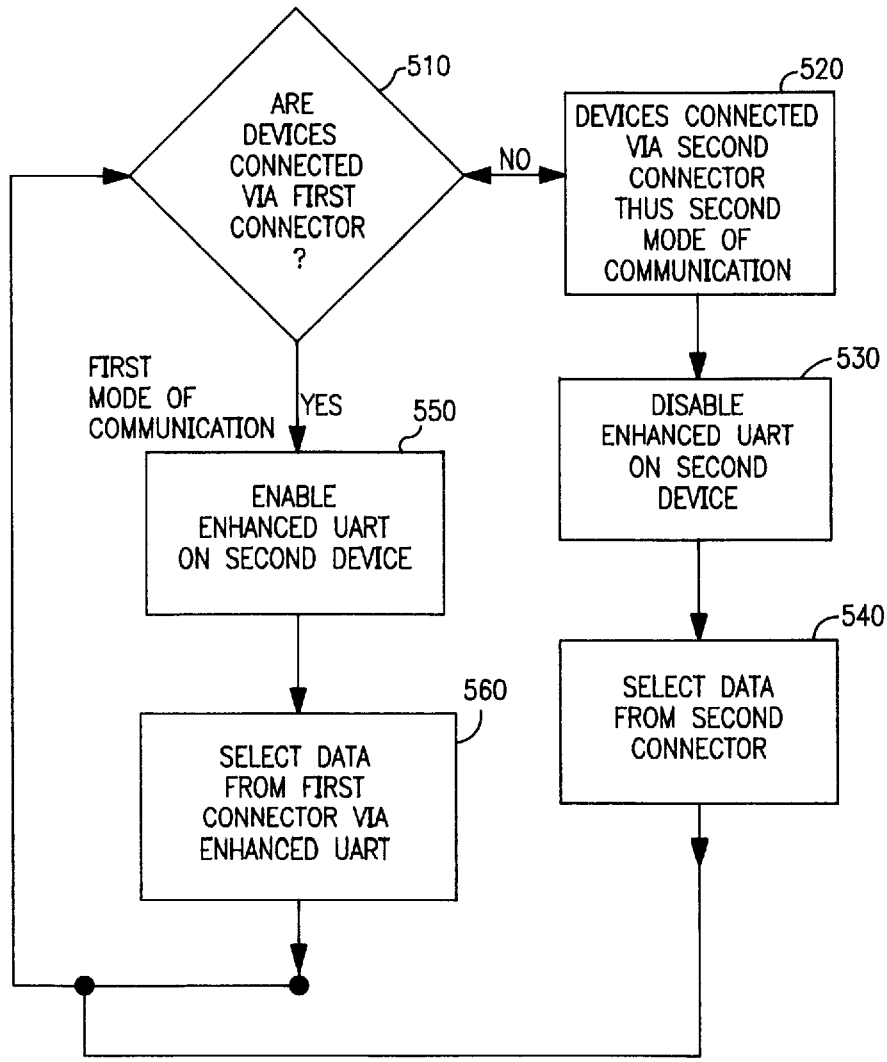
FIG. 5 is a flow diagram of the methodology of the invention.

FIG. 5 is a flow diagram of the methodology of the invention.

The steps described below are continually and repeatedly executed. The first step is to check if the devices are connected via a first connector, such as a PCMCIA connector (step 510). This corresponds to detecting an active signal on an activity indicator, such as a voltage detect line. If the devices are connected by the first connector, the first mode of communications is thereby indicated. In the first mode of communication, the first step is to enable the enhanced UART on the second device (step 550), which corresponds to the peripheral such as the dual-mode PCMCIA/serial modem referred to in various embodiments of the invention. The enhanced UART may be considered enabled since no disable signal was issued to it. Since the devices are connected via the first connector, the next step is to select data from the first connector rather than the second connector (step 560) through the enhanced UART.

If the devices are not connected via the first connector, then presuming the devices are connected, connection is deemed to have occurred through the second connector, thus the second mode of communication (step 520). In the second mode, the enhanced UART is disabled rather than enabled (step 530). Finally, while in the second mode, data can be selected from the second connector (step 540).

Figure 6:
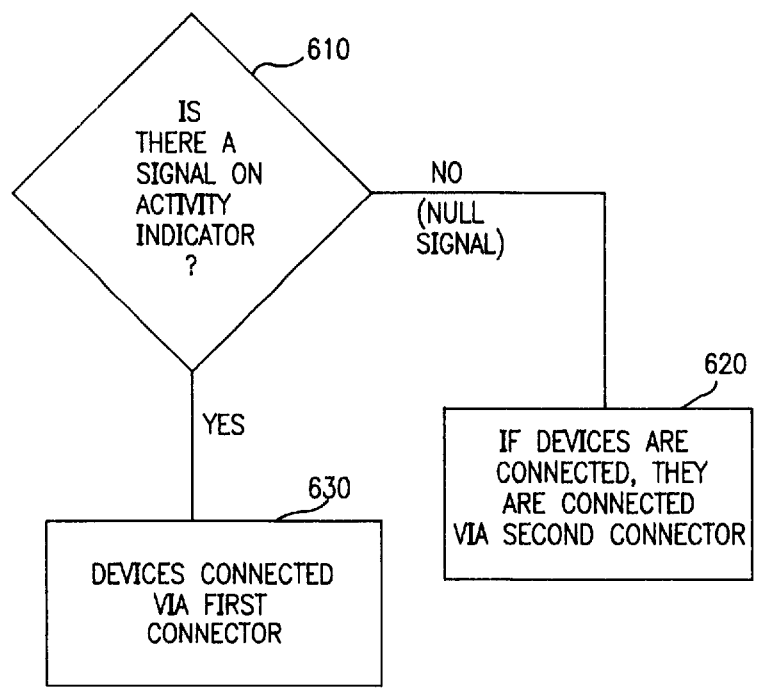
FIG. 6 is a flow diagram of connection detection according to one embodiment of the invention.

FIG. 6 is a flow diagram of connection detection according to one embodiment of the invention.

According to step 610, the activity indicator is checked for a signal, such as a voltage signal (step 610). If there is a signal indicating activity, then the devices are deemed to have been connected via the first connector (step 630), since the first connector includes a power detect line. The power detect line (activity indicator) of the first connector indicates that power for the second device is being supplied by the first device. If there is no activity on the activity indicator (a null signal), then the devices are deemed to be connected via the second connector (step 620), since the second connector includes no power or connect detect line.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method for dynamically placing a first and second device into one of a first or second mode of communication comprising the steps of:

detecting whether said second device is connected to said first device via one of a first connector or a second connector, a connection via said first connector indicating said first mode and a connection via said second connector indicating said second mode;

disabling an enhanced data transmission and reception buffer on said second device while in the first mode, said enhanced data transmission and reception buffer enabled while in the second mode; and selecting for communication data from said first connector while in said first mode and from said second connector while in said second mode, wherein said first connector is a PCMCIA adapter and said second connector is a serial adapter, said communication carried out with a computer system, said PCMCIA adapter and said serial adapter connected together with said computer system.

2. A method according to claim 1 wherein said step of detecting includes the step of detecting a signal level on an activity indicator, a null signal on said activity indicator indicating that said first connector is not being utilized to connect said second device and said first device, and an active signal on said activity indicator indicating that said first connector is being utilized to connect said second device and said first device.

3. A peripheral device for connecting to a computer system comprising:

a PCMCIA adapter configured to be connectable to said computer system;

a serial adapter configured to be connectable to said computer system;

an enhanced universal asynchronous receive/transmit (EUART) unit coupled to said PCMCIA adapter, said EUART configured to disable upon receiving a null condition from an activity indicator from said PCMCIA adapter, said null condition indicating that said PCMCIA adapter is not connected to said computer system;

a data switch coupled to a said serial adapter and said PCMCIA adapter, said data switch configured to route data from said serial adapter when receiving said null condition from said activity indicator, said data switch further configured to route data from said PCMCIA adapter when receiving a detected condition from said activity indicator, said data switch connecting together said PCMCIA adapter and said serial adapter with said computer system.

4. A peripheral device according to claim 3 further comprising an embedded processor coupled directly to said data switch.

5. A peripheral device according to claim 4 further comprising:

a parallel data bus coupled to said embedded processor configured to communicate data to said embedded processor in parallel; and a universal asynchronous receive/transmit unit (UART) coupled to said parallel data bus and to said data switch, said UART configured to serialize data originating from said parallel data bus and to deserialize data destined for said parallel data bus.

6. A peripheral device according to claim 5 wherein said embedded processor is configured to communicate with a processor of said computer system by dynamically utilizing one of a PCMCIA interface and a serial port.

7. A peripheral device for connecting to a computer system comprising:

a PCMCIA adapter configured to be connectable to said computer system;

a infrared data access (IRDA) interface configured to be connectable to said computer system;

an enhanced universal asynchronous receive/transmit (EUART) unit coupled to said PCMCIA adapter, said EUART configured to disable upon receiving a null condition from an activity indicator from said PCMCIA adapter, said null condition indicating that said PCMCIA adapter is not connected to said computer system;

a data switch coupled to said IRDA interface and said PCMCIA adapter, said data switch configured to route data from said IRDA interface when receiving said null condition from said activity indicator, said data switch further configured to route data from said PCMCIA adapter when receiving a detected condition from said activity indicator, said data switch connecting together said PCMCIA adapter and said IRDA interface with said computer system.

8. A peripheral device according to claim 7 further comprising an embedded processor coupled directly to said data switch.

9. A peripheral device according to claim 8 further comprising:

a parallel data bus coupled to said embedded processor configured to communicate data to said embedded processor in a parallel fashion; and a universal asynchronous receive/transmit unit (UART) coupled to said parallel data bus and to said data switch, said UART configured to serialize data originating from said parallel data bus and to deserialize data destined for said parallel data bus.

10. A peripheral device according to claim 9 wherein said embedded processor is configured to communicate with a processor of said computer system by dynamically utilizing either one of a PCMCIA interface or a IRDA port.

11. A system for dynamically modifying the mode of communication for a first device connecting to a second device, said system comprising;

detection circuitry for coupling to said first and second devices for detecting one of a first connector and a second connector, wherein said first connector is a PCMCIA adapter, and said second connector is a serial adapter, between said first and second devices, said first connector indicative of a first mode of communication and said second connector indicative of a second mode of communication, said first device including a computer system; and switching circuitry for coupling to said second device and coupled to said detection circuitry, said switching circuitry configured to route data from said first connector during said first mode and to route data from said second connector during said second mode, said second device including:

an enhanced communications buffer coupled between said switching circuitry and said first connector; and disabling circuitry coupled to said detection circuitry and to said enhanced communications buffer, said disabling circuitry configured to disable said enhanced communications buffer during said second mode of communication, said switching circuitry connecting together said PCMCIA adapter and said serial adapter with said computer system.

12. A system according to claim 11 wherein said second device is a modem.

13. A system according to claim 11 wherein said switching circuitry includes:

a select line coupled to said detection circuitry; and a set of 2-to-1 multiplexers coupled to said switching circuitry, said set of multiplexers configured to facilitate routing of data, each multiplexer coupled to said select line, each said multiplexer configured to select for routing data from said first connector when said detection circuitry indicates said first mode, each multiplexer further configured to select for routing data from said second connector when said detection circuitry indicates a second mode.

14. A system according to claim 11 wherein said second connector includes an infrared data access (IRDA) interface.

* * * * *